Figure 2:
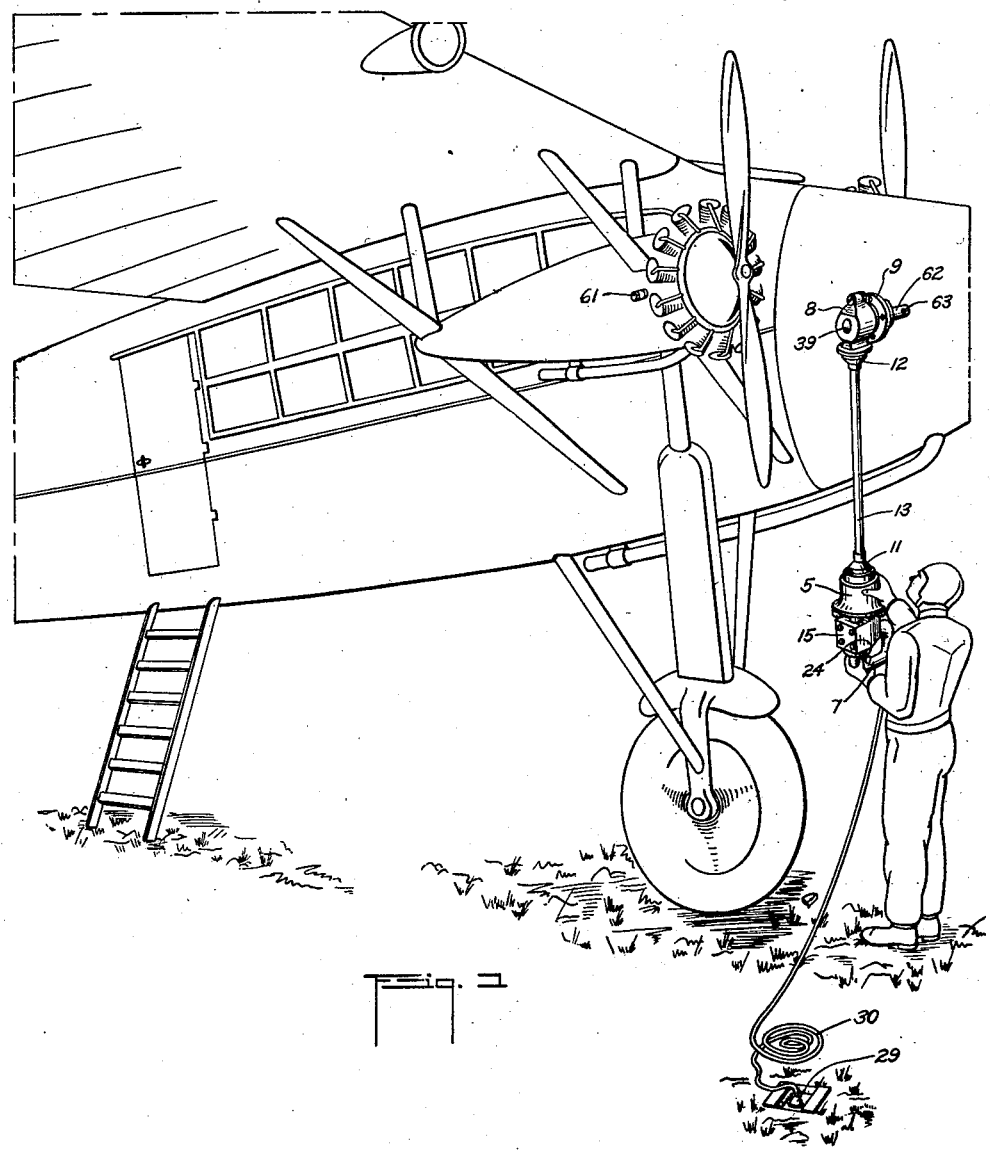

INVENTOR.
Raymond P. Lansing
BY
ATTORNEY.

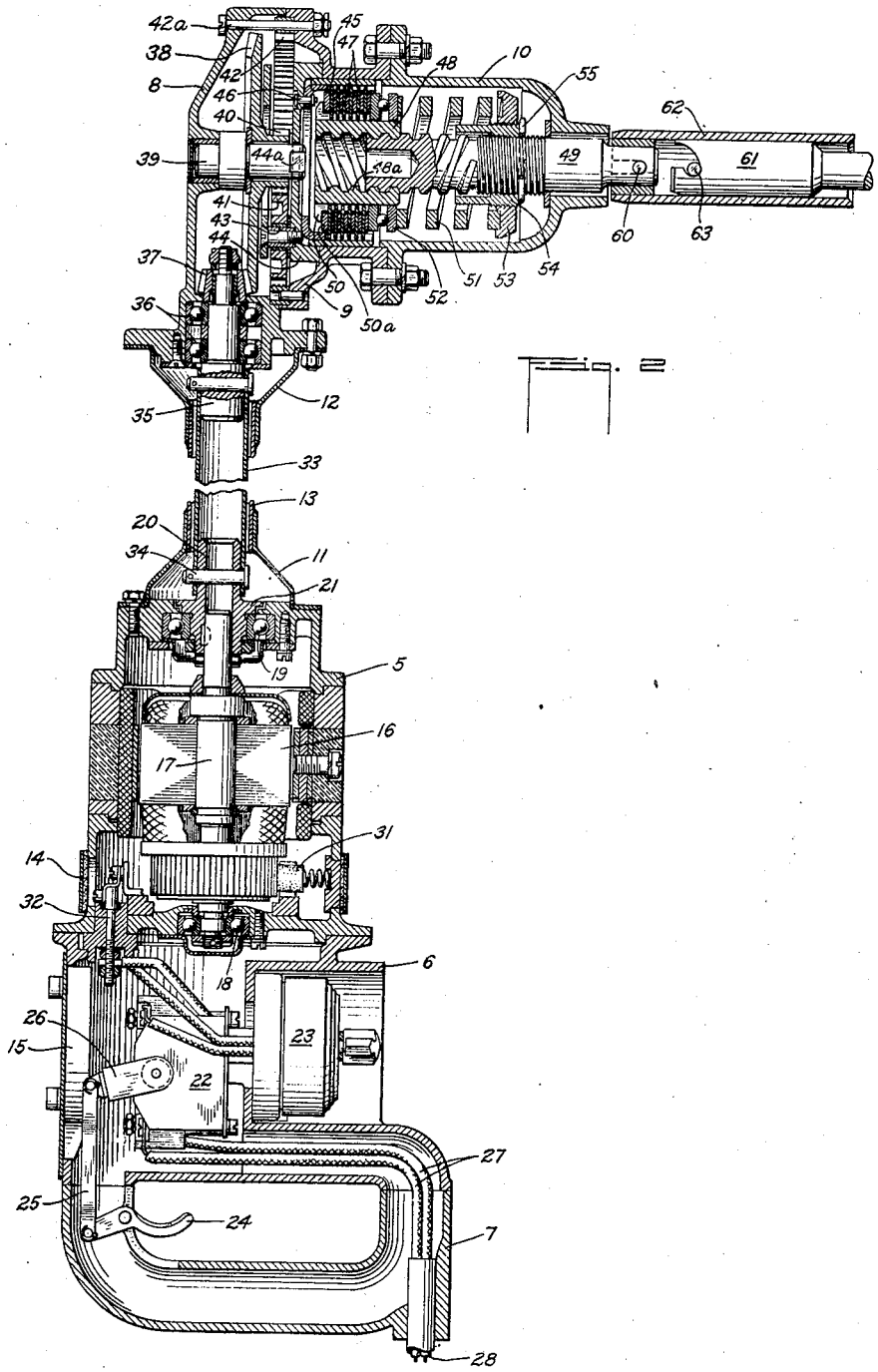

Patented Sept. 5, 1939

2,172,126

UNITED STATES PATENT OFFICE

2,172,126

DRIVING MECHANISM

Raymond P. Lansing, Montclair, N. J., assignor to Eclipse Aviation Corporation, East Orange, N. J., a corporation of New Jersey Application October 31, 1933, Serial No. 696,109
Renewed August 24, 1937

2 Claims. (Cl. 123—179)

This invention relates to power units, and more particularly to power units of the portable type adapted to deliver power to rotatable members.

One of the objects of the present invention is to provide a novel external low speed, high torque power unit for rotatably driving an external member irrespective of the plane of its axis of rotation, said unit being adapted for use in energizing inertia starters for internal combustion engines, for example.

For starting large, high powered motors, such as are used in modern aircraft, an inertia type starter has been developed to a high state of efficiency, and such starters are in general use in this industry today. It is necessary in this type of starter to provide either manual or power means for storing a large amount of kinetic energy in an inertia flywheel and suitable means for transmitting this energy to the engine for cranking the same. If power means are provided for rotating the flywheel, such means usually consist of an electric motor and a source of electric energy for actuating the motor such as the storage battery. It is readily seen that such an installation requires space and adds weight to the plane, both of which are important considerations in aircraft design and particularly in large multi-motored aircraft. Manually operated inertia starters are provided but many of the evident advantages of a power driven installation are lost. It has, however, been difficult to design for all types of aircraft a power plant incorporating an inertia starter wherein the starter cranking shaft is readily accessible for easy manual operation. In any event, it is desirable with this type of starter to have power means for accelerating the inertia member since in a given starter more energy may be stored in the flywheel with less delay by power means than by manual means.

It is, therefore, an object of this invention to provide a novel portable power unit which may be energized from an external source and which is particularly adapted for cranking or accelerating the inertia member of an inertia type starter.

Another object is to provide novel portable power apparatus which has its weight disposed in such a manner as to contribute materially to the easy handling of the device.

A further object is to provide a novel portable power unit wherein the operator handling the same has a leverage against the torque reactions which are transmitted to him, thereby increasing the load which may be safely placed upon the power device, or unit and consequently increasing the practical applications of the device. As an additional aid in the efficacious handling of the torque reactions, means are provided for varying the torque transmitting capacity gradually, from a minimum to a predetermined maximum, the increase in capacity being brought about automatically in response to the assumption of the load, as constituted by the part to be energized. In this connection a feature of the invention is the provision of a torque responsive friction clutch located at the low speed end of the reduction gearing which drivably connects the prime mover with the work end of the unit.

A still further object is to provide a novel external power unit, the rotation of which may be readily reversed so that a single unit may be used for driving members in either a clockwise or counterclockwise direction.

The above and further objects and novel features of this invention will more fully appear from the following detailed description and the accompanying drawings wherein like reference characters refer to like parts in the several views. It is to be expressly understood, however, that the drawings are for the purposes of illustration only and are not designed as a definition of the limits of the invention, reference being had for this purpose to the appended claims.

In the drawings:

Fig. 1 is a perspective view illustrating a practical application of the present invention; and Fig. 2 is a side elevation view, partly in section and with parts broken away, illustrating an embodiment of said invention.

Referring to the drawings, and more particularly to Fig. 2, the illustrated embodiment includes a rigid portable casing for completely covering the working parts of the device, thus protecting them against damage which might otherwise result during the frequent handling thereof. The casing, as shown, comprises a lower portion consisting of a motor housing 5, switch housing 6 and handle 7, and an upper portion composed of gear housing sections 8 and 9 and a light metal protecting housing 10 with a shaft housing constituted by members 11, 12 and 13 for rigidly securing together said upper and lower portions. The various members comprising the casing may be secured to one another by any suitable means, and hand holes, fitted with suitable cover plates, such as 14, 15, may be provided so that easy access may be had to the enclosed mechanisms.

The driving power of the device may be supplied by any suitable means such as an electric motor 16 shown mounted in the housing 5. The motor armature and shaft 17 are mounted for vertical operation such as in ball bearings 18 and 19. For the purpose of aiding these bearings in the support of the armature and shaft 17 during operation, a stub shaft 20 may, as shown, be suitably secured to the upper end of shaft 17 and have an annular abutment 21 bearing against the upper surface of a shoulder on housing 5.

Suitable means are provided for energizing the driving means from an external source and, as shown, such means provides also for reversing the rotation of said driving means. The energizing means illustrated includes a snap switch 22 for opening and closing the circuit and reversing switch 23 connected in series therewith, said two switches being suitably mounted on housing 6. The operation of the switch 22 may be controlled from a finger trigger 24 pivoted on the handle 7 and operatively connected to said switch by means of link 25 and arm 26. Cables 27 are provided as incoming leads to the switch 22 and are fitted at 28 with means for attaching thereto a cable 30 of any desired length which in turn may be connected to an external source of energy such as a portable storage battery or other suitable source such as a power line tap as shown at 29 in Fig. 1. The circuit through cable 30 and switches 22, 23 may be completed to the commutator brushes 31, only one of which is shown, through the binding post 32 supported by and insulated from the housing 5.

Novel torque transmitting means, which preferably include a driving shaft, reduction gearing, and the above described torque-responsive clutch, are provided for transmitting the energy of the motor to an external driven member. There is shown a novel and advantageous arrangement of said torque transmitting means which serves the useful purpose of distributing the torque reactions during operation in a manner most favorable to the operator. In the illustrated embodiment, an extension shaft 33, preferably hollow for lightness and rigidity, is provided to transmit the energy of the motor to a reduction gear train hereinafter described in detail. Shaft 33 is rigidly secured at its lower end to the stub shaft 20, such as by pin 34, and in like manner a second stub shaft 35 is in turn secured to the upper end of shaft 33. The latter named stub shaft 35 is rotatably mounted in housing member 8, such as by a pair of roller bearings 36 and has a bevel pinion 37 mounted on the upper reduced portion thereof for rotary movement therewith, said pinion being maintained on said shaft by means of a nut threaded on the latter.

A reduction gear train having its axis at an angle to the motor driven shaft 33 may be provided, and in the present embodiment such axis is shown at right angles to said shaft. The illustrated gear train comprises a bevel gear 38 constantly in mesh with bevel pinion 37 and rotatably mounted on a supporting shaft 39 journaled in the housing member 8. Formed integral with, or otherwise attached to gear 38, and concentric therewith, is a sun gear 40 which meshes with a plurality of planetary gears 41, preferably three in number, spaced at 120 degree intervals to mesh with an annular gear 42 held in position by bolts 42a extending through and joining the housing sections 8 and 9. The planetary gears 41 may, as shown, be rotatably mounted on bearing sleeves 43 which are in turn countersunk in a flanged plate 44 surrounding, and rotating with, shaft 39, a suitable flat area 44a being provided on the shaft for this purpose, and a corresponding flat surface milled in plate 44. The gears 41 may be maintained on sleeves 43 by set screws extending through the central openings in said sleeves and threadedly received by the plate 44.

In order to aid in the control of the torque reactions, particularly in the event of an overload, such as might be produced by the inertia of the stationary parts to be driven, the torque-responsive friction clutch above referred to is employed. It is preferably located, as above suggested, at the low speed end of the reduction gearing, and includes a barrel or cylinder 45 having an inwardly projecting flanges or rim for attachment to the plate 44 by any suitable means such as by pins 46. As shown, the rotation of cylinder 45 is trasmitted by a plurality of friction discs 47, in interleaving and frictional engagement one to the other, to a splined nut 48 having quick pitch threads 48a engaging corresponding threads on a shaft 49. The direction of pitch of the threads will, of course, depend upon the direction in which the motor rotates; and if on any occasion the operator desires to reverse the direction of rotation of the motor, he will first substitute a new clutch assembly, in which the threads 48a are of opposite pitch. Onehalf of said discs are splined to the inner surface of barrel 45 and alternating therewith are the remaining half of the discs which have a splined engagement at their inner peripheries with the outer surface of nut 48. The latter is provided at its outer end with a radially extending flange 50 that bears against an annular bushing or pressure-plate 50a which in turn engages the inner disc 47. The discs 47 are held at the other end of the assembly by the pressure of coil spring 51 interposed between a ball bearing assembly 52 which engages the outer disc 47 and an adjusting nut 53 threadedly received on a sleve 54 for varying the load value at which slippage will occur between discs 47. Preferably, the sleeve 54 and the shaft 49 are maintained in the adjusted position by a cotter pin 55.

Shaft 49 may be of any desired length and may, as shown, be provided with a pin 60 which is adapted to engage a slot in a sleeve 62 which is in turn provided with a pin 63 registrable with a cam tooth or diagonal slot in the member to be driven such as, for example, a hollow extension shaft of an inertia starter, projecting from the housing of the associated engine, as indicated at 61 in Fig. 1, and also designated in Fig. 2 by the reference character 61. The purpose of the firstnamed slot, of course, is to permit axial movement of shaft 49.

In applying the above described apparatus to one of its practical uses, that of an accelerating unit for inertia starters, a cycle of operation is as follows:

Referring first to Fig. 1, the cable 30 is plugged into the electrical connection 29 and the unit is raised by hand until the pin 63 comes into engagement with the diagonal slot of the extension shaft 61. Switch 23 having been set for the direction of rotation corresponding to the pitch of threads 48a, the operator pulls the trigger 24 which operates through links 25, 26 to close switch 22 and complete the circuit through switch 23 and brushes 31 to the motor 16. As the armature shaft of the latter begins to rotate, its motion is transmitted through tubular shaft 33, pinion 37, gear 38, sun gear 40, planetary gears 41, plate 44, discs 47, nut 48, shaft 49, pins 60, 63 to the extension shaft 61 which, under the present hypothesis, is effective to drive the flywheel of the inertia starter. As pin 63 takes hold, thereby tending to stop the rotation of shaft 49, this tendency causes the shaft to thread itself through the nut 48 in a leftward direction, carrying the collar 53 also to the left, and compressing spring 51, thus placing a gradually increasing pressure on clutch discs 47. The predetermined maximum is reached when the inner end of sleeve 54 contacts the outer end of nut 48. When sufficient energy has been stored in said flywheel, the trigger 24 is released and a suitable spring within switch 22 is operative to open the electric circuit and de-energize motor 16. The speed of the extension shaft 61 will now exceed the speed of pin 63, and the cam slot of said extension shaft becomes operative to move the pin 63 out of engagement therewith.

It is seen from the foregoing that there has been provided a novel power unit which may be operated from an external source of energy and which may be readily applied to many practical uses. In its use in connection with airplane starters, it is seen that much weight has been dispensed with and considerable space has been conserved in the power plant of the plane, while all the advantages of a power driven starter are retained. It is apparent also that the novel construction of this device makes it easy to handle, and by virtue of the fact that the complete unit constitutes a lever, the torque reactions during operation may be overcome without undue effort on the part of the operator. It is also pointed out that by reason of this device the most convenient time may be selected for energizing power driven starters, thereby conserving the energy of the plane's storage battery.

While there has been shown and described only one form of the invention, it is to be expressly understood that the same is not limited thereto but may be embodied in various mechanical forms. For example, it is to be understood that various types of yielding driving means may be employed in lieu of the friction disc clutch herein illustrated, and that any other suitable power means might be substituted for the electric motor shown, such as, for example, a compressed air motor. Various other changes may also be made without departing from the spirit thereof. Reference will be had to the appended claims for a definition of the limits of the invention.

This application contains matter disclosed in other of my applications as follows:

(1) Application No. 309,286 filed jointly by George J. Hausamann and myself on September 29, 1928, and finally rejected May 13, 1935 (rejection affirmed by U. S. Court of Customs and Patent Appeals on March 22, 1937).

(2) Application No. 356,542 filed by me on April 29, 1929, now Patent No. 1,768,083 granted June 24, 1930.

(3) Application No. 135,312 filed jointly by George J. Hausamann and myself on April 6, 1937.

What is claimed is:

1. A portable power unit including driving and driven members rotatable about intersecting axes, a clutch interposed between said members, and means for increasing the torque transmitting capacity of said clutch in response to application of load to said driven member, said last-named means comprising cooperating helically grooved members on axially spaced portions of said driven member, and means for moving one of said helically grooved members toward the other to increase the pressure on said clutch.

2. The combination with driving and driven members of a clutch interposed between said members, and means for increasing the torque transmitting capacity of said clutch in response to application of load to said driven member, said last-named means comprising cooperating helically grooved members on axially spaced portions of said driven member, and means for moving one of said helically grooved members toward the other to increase the pressure on said clutch.

RAYMOND P. LANSING.